US009286670B2

(12) United States Patent
Sakamoto et al.

(10) Patent No.: US 9,286,670 B2
(45) Date of Patent: Mar. 15, 2016

(54) PATHOLOGICAL DIAGNOSIS ASSISTING APPARATUS, PATHOLOGICAL DIAGNOSIS ASSISTING METHOD AND NON-TRANSITORY COMPUTER READABLE MEDIUM STORING PATHOLOGICAL DIAGNOSIS ASSISTING PROGRAM

(71) Applicants: KEIO UNIVERSITY, Tokyo (JP); NEC CORPORATION, Tokyo (JP)

(72) Inventors: Michiie Sakamoto, Tokyo (JP); Akinori Hashiguchi, Tokyo (JP); Tokiya Abe, Tokyo (JP); Akira Saito, Tokyo (JP); Maki Sano, Tokyo (JP)

(73) Assignees: KEIO UNIVERSITY, Tokyo (JP); NEC CORPORATION, Tokyo (JP)

( * ) Notice: Subject to any disclaimer, the term of this patent is extended or adjusted under 35 U.S.C. 154(b) by 468 days.

(21) Appl. No.: 13/686,768

(22) Filed: Nov. 27, 2012

(65) Prior Publication Data

US 2013/0136325 A1 May 30, 2013

(30) Foreign Application Priority Data

Nov. 28, 2011 (JP) .................................. 2011-259326

(51) Int. Cl.
*G06K 9/00* (2006.01)
*G06T 7/00* (2006.01)

(52) U.S. Cl.
CPC .......... *G06T 7/0012* (2013.01); *G06K 9/00147* (2013.01); *G06T 2207/10056* (2013.01); *G06T 2207/20081* (2013.01); *G06T 2207/30024* (2013.01)

(58) Field of Classification Search
CPC ........... G06T 2207/10056; G06T 2207/30024
See application file for complete search history.

(56) References Cited

U.S. PATENT DOCUMENTS

| | | | |
|---|---|---|---|
| 7,467,119 B2 * | 12/2008 | Saidi et al. .................. 706/21 |
| 7,483,554 B2 * | 1/2009 | Kotsianti et al. .............. 382/128 |
| 2002/0164810 A1 * | 11/2002 | Dukor et al. .................... 436/64 |
| 2004/0067916 A1 * | 4/2004 | Delyani et al. ................ 514/169 |
| 2007/0014460 A1 * | 1/2007 | Kuziela et al. ................ 382/128 |
| 2010/0054560 A1 * | 3/2010 | Yamashita et al. ............ 382/128 |
| 2013/0136324 A1 * | 5/2013 | Sakamoto ............. G06T 7/0012 382/128 |
| 2013/0136325 A1 * | 5/2013 | Sakamoto et al. ............ 382/128 |
| 2013/0195883 A1 * | 8/2013 | Weston et al. ............. 424/158.1 |

OTHER PUBLICATIONS

Ungar, H. "Elastosis in fibrotic and cirrhotic processes of the liver" (Abstract only), Arch Pathology, 1959, p. 331-341.*

(Continued)

*Primary Examiner* — Gandhi Thirugnanam
(74) *Attorney, Agent, or Firm* — Maschoff Brennan (57) ABSTRACT

A pathological diagnosis assisting apparatus according to the present invention provides the diagnosis assisting information for assisting diagnosis of tissue fibrosis from the image of the stained sample, and includes an image reading unit configured to read the image of the stained sample and an image processing unit configured to process the image. The image processing unit includes an image classification unit configured to classify the collagenous fiber and the elastic fiber, a tissue area extraction unit configured to extract a tissue area, an occupancy rate calculation unit configured to calculate the occupancy rates of the collagenous fiber and the elastic fiber in the tissue area, and a diagnosis assisting information providing unit configured to provide the diagnosis assisting information based on the calculated occupancy rates of the collagenous fiber and the elastic fiber.

4 Claims, 5 Drawing Sheets

(56) References Cited

OTHER PUBLICATIONS

Kanta J. et al. "Elastin content in human fibrotic and cirrhotic liver" (Abstract only), Sb Ved Pr Lek Fak Karlovy Univerzity Hradci Kralove, 1990, p. 1.*

Ichida F. et al. "New Inuyama classification; new criteria for histological assessment of chronic hepatitis", 1996, International Hepatology Communications 6, p. 112-119.*

Ungar, H., 1959: Elastosis in tibrotic and cirrhotic processes of the liver. Arch Pathol6: 331-341.*

Waldrop F.S., "Light Microscopic Distinction of Collagens in Hepatic Cirrhosis", 1982, Histochemistry 74, p. 487-491.*

Pellicoro A., et al., "Elastin Accumulation is Regulated at the level of Degradation by Macrophage Metalloelastase (MMP-12) During Experimental Liver Fibrosis", Jun. 2012, Hepatology, p. 1965-1975.*

Roderick N.M. MacSween, Alastair D. Burt, Bernard C. Portmann, Kamal G Ishak, Peter J. Scheuer, Peter P. Anthony Pathology of the Liver 4th edition, pp. 579, 2002.

Calvaruso V/ et al., "Computer-assisted image analysis of liver collagen: Relationship to Ishak scoring and hepatic venous pressure gradient" Hepatology vol. 49, Issue 4, pp. 1236-1244, Apr. 2009.

Afdhal Nh et al., "Urinary assays for desmosine and hydroxylysylpyridinoline in the detection of cirrhosis" J Hepatol. 1997 Dec;27(6):993-1002.

Japan Office Action dated Dec. 1, 2015 in application No. 2011-259326 ( with English translation).

\* cited by examiner

PATHOLOGICAL DIAGNOSIS ASSISTING APPARATUS, PATHOLOGICAL DIAGNOSIS ASSISTING METHOD AND NON-TRANSITORY COMPUTER READABLE MEDIUM STORING PATHOLOGICAL DIAGNOSIS ASSISTING PROGRAM

FIELD OF THE INVENTION

The present invention relates to a pathological diagnosis assisting apparatus, a pathological diagnosis assisting method and a non-transitory computer readable medium storing a pathological diagnosis assisting program.

BACKGROUND OF THE INVENTION

Progression of destruction and tissue fibrosis due to chronic inflammation in some organs are known to carry a risk of cancerogenesis. Assessment of a stage of tissue fibrosis is of great importance in order to find a phase of the progression of a lesion and, further, to determine the risk of the cancerogenesis.

Chronic hepatitis is known as a disease which assessment of the stage of tissue fibrosis is of importance. As a method to assess the stage of tissue fibrosis, there is histopathological diagnosis. In histopathological diagnosis, a pathologist visually diagnoses a structural disorder due to fibrotic tissues. Generally, New Inuyama Classification is used for a diagnosis of the stage of fibrosis of liver tissue. According to New Inuyama Classification, the stage of fibrosis is classified into four stages of F1 to F4. In detail, the stage of fibrosis is classified into: no fibrosis (F0), peripheral expansion of fibrosis (F1), formation of fibrous cross-linking (F2), formation of the fibrous cross-linking associated with a strained lobule (F3), and cirrhosis (F4). However, since such classification is subjectively made by the pathologist using a pathology sample based on his/her own knowledge and experience, diagnosis according to the classification requires certain proficiency.

Also, in order to assess the stage of fibrosis, there is a method, by processing an image of the pathology sample stained by a stain such as Sirius red and the like for staining a collagenous fiber, to identify an area of the collagenous fiber and to calculate an area occupancy rate of the collagenous fiber (for example, see Non-Patent Document 1). The reason focusing on the collagenous fiber is that it has become known that, with the progression of the stage of fibrosis, the area occupancy rate of the collagenous fiber increases in the tissue. The method according to Non-Patent Document 1, by using a threshold interactively determined by the operator for each of values of RGB (Red, Green, Blue) components and values of HSV (Hue, Saturation, Value) components of the image of the stained sample, the area of the collagenous fiber is extracted.

On the other hand, it has been reported that, with the progression of the stage of tissue fibrosis, an elastic fiber as well as the collagenous fiber increases (for example, see Non-Patent Documents 2, 3). According to Non-Patent Document 2, since the elastic fiber is slowly accumulated in the cirrhotic liver, when the fibrous septa contains the elastic fiber, it is indicated that the tissue formed by the fibrous septa is not recently generated. According to Non-Patent Document 3, there is a correlation between a quantity of the elastic fiber in urine and tissue fibrosis.

RELATED ART DOCUMENTS

Non-Patent Document

Non-Patent Document 1: Calvaruso V et al. Computer-Assisted Image Analysis of Liver Collagen: Relationship to Ishak Scoring and Hepatic Venous Pressure Gradien. HEPATOLOGY 2009; 49: 1236-1244

Non-Patent Document 2: Roderick N. M. MacSween, Alastair D. Burt, Bernard C. Portmann, Kamal G Ishak, Peter J. Scheuer, Peter P. Anthony Pathology of the Liver 4th edition, pp. 579, 2002

Non-Patent Document 3: Nezam Afdhal, Andrew P. Keaveny, Steven B. Cohen, David P. Nunes, Norris Maldonado, Michael O'Brien and Phillip J. Stone "Urinary assays for desmosine and hydroxylysylpyridinoline in the detection of cirrhosis," Journal of Hepatology 1997; 27: 993-1002

SUMMARY OF THE INVENTION

Here, when the pathological diagnosis assisting apparatus obtains diagnosis assisting information from the image of the stained sample, the diagnosis assisting information is preferably as accurate as possible. However, the diagnosis assisting information provided by a method based on the area occupancy rate of the collagenous fiber alone in the stained sample is not sufficiently accurate. Moreover, since a quantity of the elastic fiber in the tissue mentioned in Non-Patent Documents 2, 3 is small in comparison to the collagenous fiber, the elastic fiber has not been used as an index for assisting pathological diagnosis using image processing of the image of the stained sample.

The inventors has found that, by using the elastic fiber as the index of tissue fibrosis, the elastic fiber may serve not only as the index increasing/reducing in accordance with the progression of fibrosis but also as a new index indicating a time when the fibrotic tissue is generated (old/new).

Accordingly, it is an object of the present invention, in consideration of such a finding, to provide highly accurate pathological diagnosis assisting information based on the occupancy rates of the collagenous fiber and the elastic fiber in the tissue serving as the standards in detection of tissue fibrosis in image processing of the image of the stained sample. In a preferred mode of the present invention, the stage of tissue fibrosis is determined by using a total of the occupancy rates of the collagenous fiber and the elastic fiber, such that accuracy of determination by the pathological diagnosis assisting apparatus is improved. In another preferable mode, further, the stage of tissue fibrosis is determined by using the quantity of the elastic fiber slowly accumulated in the fibrous septa together with a quantity of the collagenous fiber, such that the new index enabling screening for a generation time of the fibrotic tissue is provided.

In order to achieve the above object, a pathological diagnosis assisting apparatus for providing diagnosis assisting information for assisting diagnosis of tissue fibrosis from an image of a stained sample according to an embodiment includes:

an image reading unit configured to read the image of the stained sample; and     an image processing unit configured to process the image of the stained sample, wherein the image processing unit includes an image classification unit configured to, based on a pixel value of the image of the stained sample, classify at least a collagenous fiber and an elastic fiber in the image of the stained sample, a tissue area extraction unit configured to extract a tissue area in the image of the stained sample, an occupancy rate calculation unit configured to, based on a result of classification of the image, calculate occupancy rates of the collagenous fiber and the elastic fiber in the tissue, and a diagnosis assisting information providing unit configured to provide the diagnosis assisting information based on the calculated occupancy rates of the collagenous fiber and the elastic fiber.

According to the pathological diagnosis assisting apparatus of the embodiment, preferably, the diagnosis assisting information providing unit preliminarily holds a first threshold and a second threshold serving as standards for determination of a stage of tissue fibrosis progression, determines whether the occupancy rate of the collagenous fiber satisfies the first threshold and, when determining that the occupancy rate of the collagenous fiber does not satisfy the first threshold, determines whether a total of the occupancy rates of the collagenous fiber and the elastic fiber satisfies the second threshold.

According to the pathological diagnosis assisting apparatus of the embodiment, preferably, the diagnosis assisting information providing unit preliminarily holds at least one threshold serving as the standard for determination of the stage of tissue fibrosis progression, and determines whether the total of the occupancy rates of the collagenous fiber and the elastic fiber satisfies the at least one threshold.

In order to achieve the above object, a pathological diagnosis assisting method according to an embodiment for providing diagnosis assisting information for assisting diagnosis of tissue fibrosis from an image of a stained sample, includes:

an image reading step to read the image of the stained sample; and an image processing step to process the image of the stained sample, wherein the image processing step includes an image classifying step, based on a pixel value of the image of the stained sample, to classify at least a collagenous fiber and an elastic fiber in the image of the stained sample, a tissue area extracting step to extract a tissue area in the image of the sample, an occupancy rate calculation step, based on a result of classification of the image, to calculate occupancy rates of the collagenous fiber and the elastic fiber in the tissue area, and a diagnosis assisting information providing step to provide the diagnosis assisting information based on the calculated occupancy rates of the collagenous fiber and the elastic fiber.

In order to achieve the above object, a non-transitory computer readable medium storing a pathological diagnosis assisting program according to an embodiment makes a computer serving as a pathological diagnosis assisting apparatus for providing diagnosis assisting information for assisting diagnosis of tissue fibrosis from an image of a stained sample execute:

an image reading step to read the image of the stained sample;

an image classifying step, based on a pixel value of the image of the stained sample, to classify at least a collagenous fiber and a elastic fiber in the image of the stained sample;

a tissue area extracting step to extract a tissue area in the image of the sample;

an occupancy rate calculation step, based on a result of classification of the image, to calculate occupancy rates of the collagenous fiber and the elastic fiber in the tissue area; and a diagnosis assisting information providing step to provide the diagnosis assisting information based on the calculated occupancy rates of the collagenous fiber and the elastic fiber.

According to the present embodiment, in image processing of the image of the stained sample, effective pathological diagnosis assisting information may be provided based on the occupancy rates of the collagenous fiber and the elastic fiber in the tissue that serve as standards for detection of tissue fibrosis.

DETAILED DESCRIPTION OF EMBODIMENT OF THE INVENTION

A pathological diagnosis assisting apparatus according to one embodiment of the present invention will be described with reference to the accompanying drawings. A pathological diagnosis assisting method and a non-transitory computer readable medium storing a pathological diagnosis assisting program according to the present invention will become clear from the description of the pathological diagnosis assisting apparatus according to the embodiment of the present invention.

A sample used in the present embodiment is stained with, for example, EVG (Elastica Van Gieson) stein. EVG stein may stain a collagenous fiber and an elastic fiber in a tissue. Adopting this staining method to a lesional tissue obtained in a liver biopsy enables identification of the collagenous fiber in a liver cell. According to the present embodiment, in staining the sample with EVG stain, the elastic fiber is stained purple (dark purple) with Weigert's resorcin-fuchsin stain, a nuclear is stained blackish brown with Weigert's iron hematoxylin, the collagenous fiber is stained red with Van Gieson's stein (acid fuchsin), and the cytoplasm and the erythrocyte are stained yellow with Van Gieson's stein (the picric acid).

An image of the stained sample is a light transmissive image obtained by, for example, exposing transmissive lights to the stained sample and taking an image of the sample by a digital camera or a sample scanner. Needless to say, a polarization image obtained by a polarization microscope or the like may be used when the collagenous fiber is distinguishable from other components in the tissue. Further, not only image data taken by an imaging apparatus using a CCD (Charge Coupled Device) image sensor or a CMOS (Complementary Metal Oxide Semiconductor) image sensor but image data obtained by processing a color photograph taken by a film camera may also be used.

Figure 1:
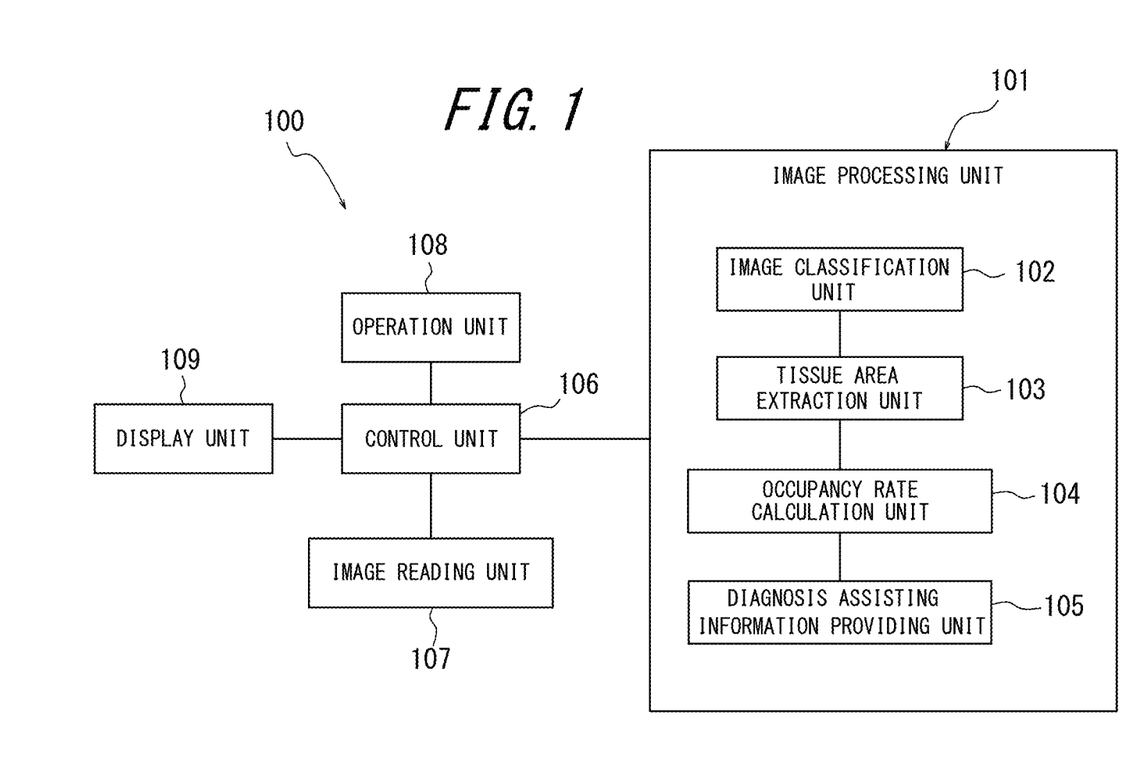
FIG. 1 is functional block diagram illustrating a pathological diagnosis assisting apparatus according to one embodiment of the present invention.

FIG. 1 is a functional block diagram illustrating a pathological diagnosis assisting apparatus according to one embodiment of the present invention. A pathological diagnosis assisting apparatus 100 provides diagnosis assisting information for assisting diagnosis of tissue fibrosis. The pathological diagnosis assisting apparatus 100 includes an image reading unit 107 configured to read the image of the stained sample, an image processing unit 101 configured to process the image of the stained sample, a control unit 106 responsible for overall operations of the pathological diagnosis assisting apparatus, an operation unit 108 configured to enable an interactive operation with an operator, and a display unit 109 configured to display the image of the stained sample and the like. The image processing unit 101 includes an image classification unit 102, a tissue area extraction unit 103, an occupancy rate calculation unit 104 and a diagnosis assisting information providing unit 105. A detailed function of each function block of the image processing unit 101 will be described below with reference to a flowchart in FIG. 2.

The image processing unit 101 and the control unit 107 are configured by using, for example, CPU (Central Processing Unit) or DSP (Digital Signal Processor). The image reading unit 107 is configured by using, for example, an interface, a CD-ROM reading device or the like. The operation unit 108 functions as an input unit enabling the interactive operation with a user and is configured by using, for example, a keyboard or a touch panel. The display unit 109 is configured by using, for example, a liquid crystal display, a plasma display or a CRT display and displays a stained image read from the image reading unit 107. Note that the image reading unit 107, the operation unit 108 and the display unit 109 do not need to be built in the pathological diagnosis assisting apparatus 100 but may be removably attached thereto.

Each functional block of the image processing unit 101 does not need to be physically separated from each other. That is, a function of each functional block may be implemented by a single CPU or DSP. As described below, further, the function of each functional block may be implemented by a program. In this case, the program enabling execution of a series of functions read from a recording medium such as a CD-ROM may be stored in a memory unit (not illustrated) and appropriately run by the control unit 106.

Figure 2:
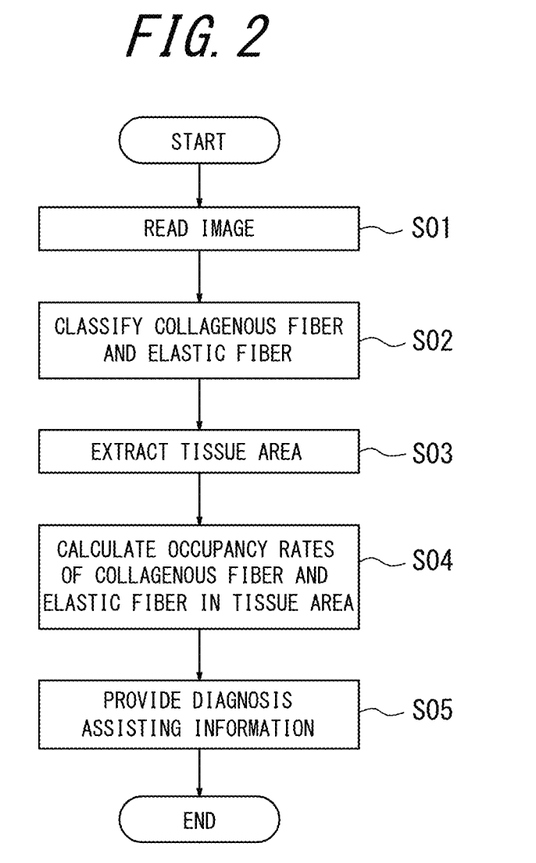
FIG. 2 is a flowchart illustrating a process performed by the pathological diagnosis assisting apparatus illustrated in FIG. 1.
Figure 3:
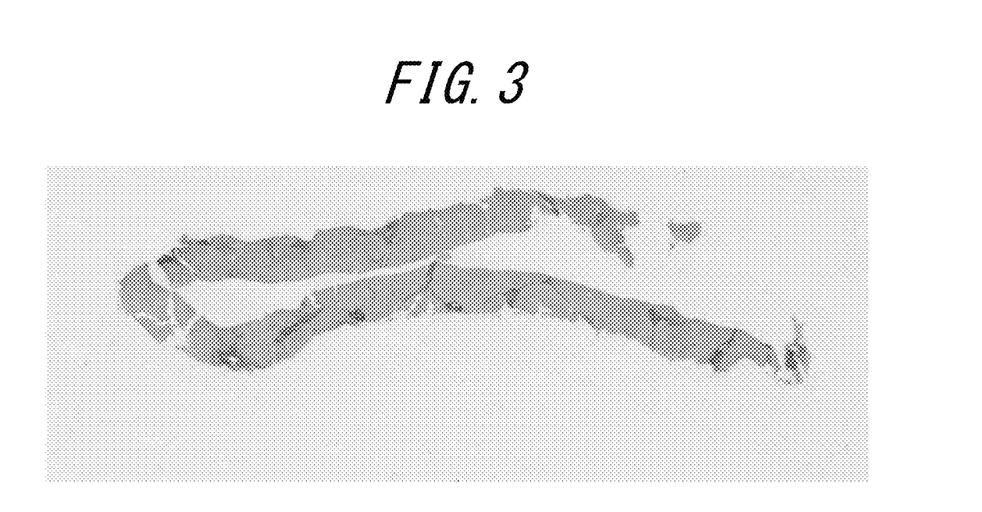
FIG. 3 is a diagram illustrating an example of a stained sample analyzed in one embodiment of the present invention.

FIG. 2 is a flowchart illustrating a process performed by the pathological diagnosis assisting apparatus illustrated in FIG. 1. The control unit 106 reads the image of the stained sample via the image reading unit 107 and stores information on the stained image of the sample in the memory unit (not illustrated) (step S01). According to the present embodiment, the image of the stained sample is an image of the sample obtained in the liver biopsy and stained with EVG stein. FIG. 3 illustrates an example of the image. In the figure, a C-shaped area extending at the center represents a tissue area in the image of the stained sample, and other areas represent the glass having the stained sample placed thereon and the like. A plurality of empty areas white in color scattered in the tissue area represent a caliber of the blood vessel and the like. Areas relatively dark in color surrounding the empty areas represent the elastic fiber and the collagenous fiber.

Next, based on a pixel value of the image of the stained sample, the image classification unit 102 classifies the collagenous fiber and the elastic fiber in the image of the sample (step S02). This classification is performed by, for example, supervised classification using a posterior probability maximization method. In detail, classes are set for classifying the collagenous fiber and the elastic fiber, the nuclear, elements included in cells forming the tissue of the cytoplasm and the like, and the glass and the like occupying outside the tissue area. Then, the classification is performed based on training data of each of the classes. According to the present embodiment, it is not necessary to obtain the training data for the image of the stained sample to be classified but the training data obtained for another image of the stained sample may be used in classification. Moreover, in the supervised classification, a maximum likelihood method and a nearest neighbor method may also be used. Further, instead of the supervised classification, unsupervised classification such as clustering may be performed.

Figure 4:
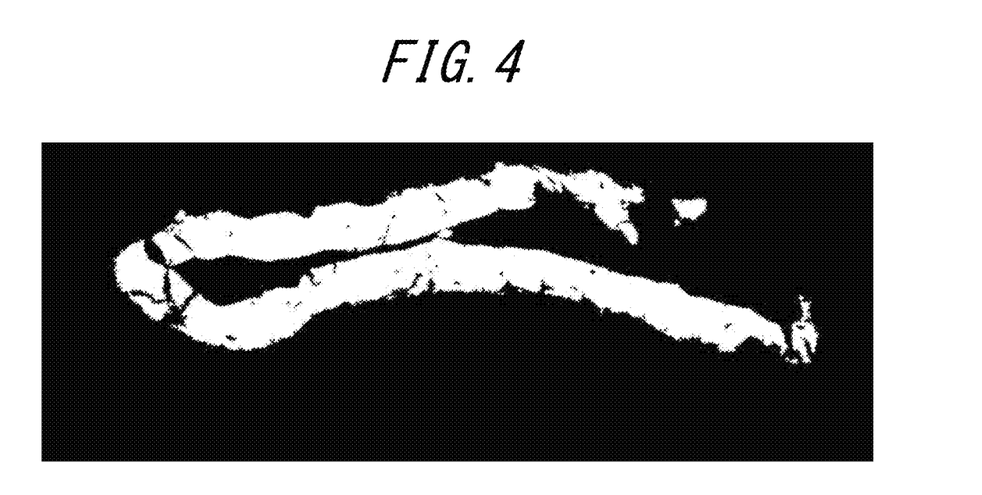
FIG. 4 is a diagram illustrating an example of a result of extraction of a tissue area according to one embodiment of the present invention.

Next, the tissue area extraction unit 103 extracts the tissue area in the image of the sample (step S03). FIG. 4 illustrates an example of a result of extraction of the tissue area by the tissue area extraction unit 103. Here, the tissue area extraction unit 103 performs mask processing to the area classified as the area outside the sample tissue such as the glass or the like, for example, at step S02. The tissue area extraction area 103 does not need to perform the mask processing based on the result of classification at step S02 but may perform the mask processing to all pixels having pixel values equal to or higher than any threshold. This is because, in a stained pathology sample, the tissue is stained in some color and non-stained area is transparent and thus has a high pixel value in the light transmissive image. Preferably, the tissue area extraction unit 103 may distinguish an existing structural region such as the blood vessel from other areas in the tissue sample and perform, for example, the mask processing thereto. This is because, since the existing structural region such as the blood vessel originally contains high proportions of the collagenous fiber and the elastic fiber, it is preferable, in order to improve accuracy of the diagnosis assisting information, to calculate the occupancy rates of the collagenous fiber and the elastic fiber in other areas.

Next, the occupancy rate calculation unit 104 calculates the occupancy rate of each of the collagenous fiber and the elastic fiber in the tissue area (step S04). For the occupancy rate of the collagenous fiber, the occupancy rate calculation unit 104 calculates a rate of the pixels classified as the collagenous fiber in all pixels of the area extracted as the tissue area at step S03. The occupancy rate calculation unit 104 calculates the occupancy rate of the elastic fiber in a similar manner. Note that, without relying on the pixels, the occupancy rate may be calculated based on a size of the tissue area and a size of the area classified as the collagenous fiber (or the elastic fiber). Also, the occupancy rate calculation unit 104 may calculate an occupancy rate in each tile dividing the image of the stained sample in a predetermined size and, as an occupancy rate representative of the entire image of the stained sample, calculate an average value of the occupancy rate in the tile.

Next, the diagnosis assisting information providing unit 105 provides the diagnosis assisting information based on the calculated occupancy rates of the collagenous fiber and the elastic fiber (step S05). The following is a description of a diagnosis assisting information generation operation by the diagnosis assisting information providing unit 105 with reference to FIG. 5.

Figure 5:
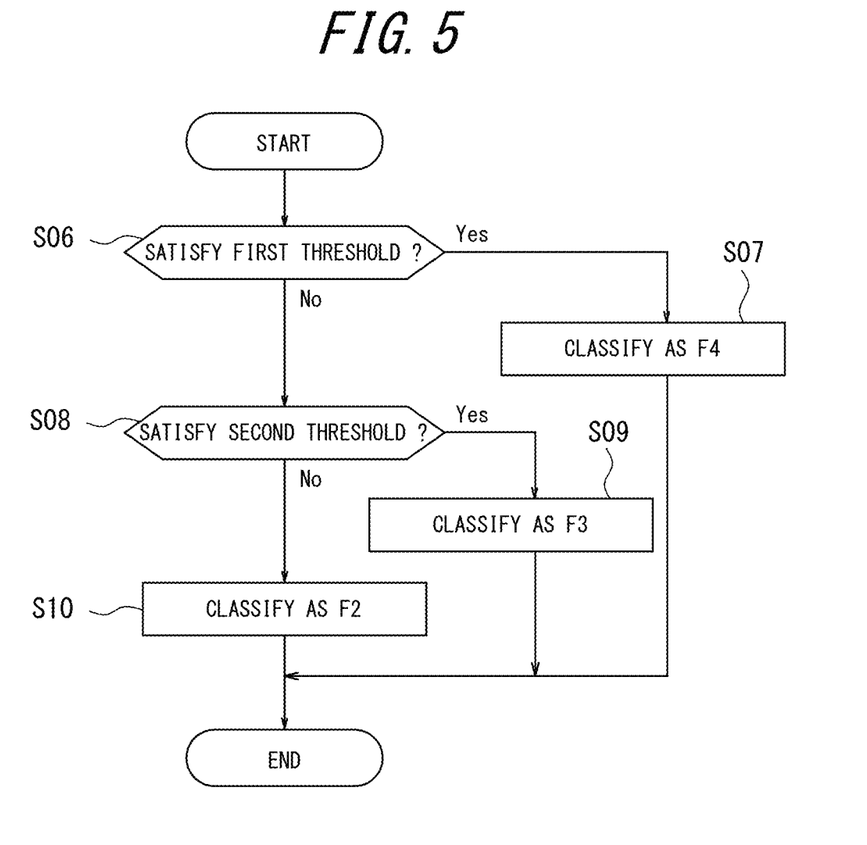
FIG. 5 is a flowchart illustrating an example of a process performed by a diagnosis assisting information providing unit of the pathological diagnosis assisting apparatus illustrated in FIG. 1.

FIG. 5 is a flowchart illustrating a process performed by the diagnosis assisting information providing unit of the pathological diagnosis assisting apparatus illustrated in FIG. 1. The diagnosis assisting information providing unit 105 preliminarily stores a first threshold and a second threshold serving as standards for determination of tissue fibrosis. The first threshold indicates more advanced progression of tissue fibrosis than the second threshold. The first threshold is, for example, a value of the occupancy rate of the collagenous fiber. When the occupancy rate exceeds this value, it is highly possible to be classified as F4 according to New Inuyama Classification. Also, the second threshold is, for example, a total of the occupancy rates of the collagenous fiber and the elastic fiber that may serve as a borderline between F2 and F3 according to New Inuyama Classification. These thresholds are preliminarily held in the diagnosis assisting information providing unit 105. These thresholds are predetermined based on, for example, a clinical test or ROC (Receiver Operating Characteristic) analysis.

ROC analysis is widely used as a method to assess accuracy of diagnosis ("Clinical Statistics Readily Available for Regular Medical Practice", Hiroshi Noto, Yodosha Co, Ltd., 2005). In determining the thresholds by the ROC analysis, a sufficient number (for example, 100) of stained samples whose results of pathological diagnoses by a pathologist are already known are prepared, and the occupancy rate of the collagenous fiber and that of the elastic fiber are calculated for the same samples. Then, ROC analysis is performed to these stained samples. In performing ROC analysis, sensitivity (a positive rate), specificity, a false-positive rate (1-specificity) are calculated for each of the stained samples. Preferably, the occupancy rate of the collagenous fiber at a point closest to a top left of a ROC curve (sensitivity 1.00, specificity 1.00) (hereinafter, referred to as a best cut-off value) is defined as the threshold described above. The operation to determine the thresholds may be performed within the pathological diagnosis assisting apparatus or by a separate PC which does not configure the pathological diagnosis assisting apparatus. Note that the thresholds determined by the ROC analysis are not limited to the best cut-off value.

First, the diagnosis assisting information providing unit 105, based on the occupancy rate of the collagenous fiber, determines whether tissue fibrosis in the image of the sample satisfies the first threshold (step S06). Then, the diagnosis assisting information providing unit 105 classifies the image of the sample satisfying the first threshold as fibrosis stage F4 (step S07). Next, the diagnosis assisting information providing unit 105, for the image of the sample determined as not satisfying the first threshold determined at step S06, determines whether the total of the occupancy rates of the collagenous fiber and the elastic fiber satisfies the second threshold (step S08). Then, the diagnosis assisting information providing unit 105 classifies the image of the sample satisfying the second threshold as fibrosis stage F3 (step S09). Also, the diagnosis assisting information providing unit 105 classifies the image of the sample not satisfying the second threshold as fibrosis stage F2 or lower (step S10).

The diagnosis assisting information providing unit 105, at step S02 in FIG. 2, may perform the diagnosis assisting information generation operation as described below with reference to FIG. 6. In such a case, the diagnosis assisting information providing unit 105 preliminarily stores at least one threshold. The at least one threshold corresponds to, for example, the total of the occupancy rates of the collagenous fiber and the elastic fiber for determining the presence or absence of tissue fibrosis regardless of the stage of New Inuyama Classification.

Figure 6:
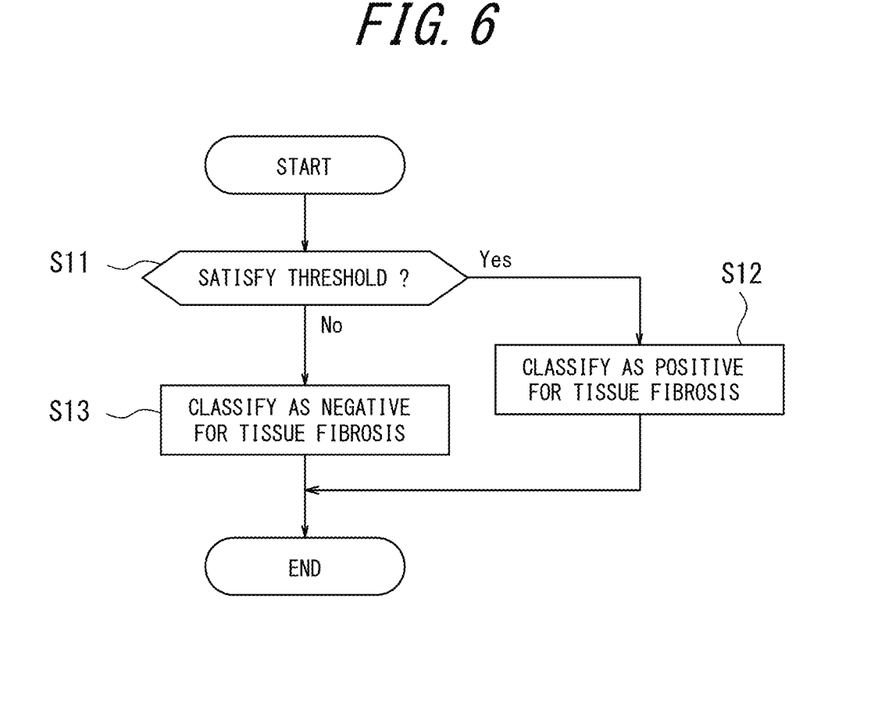
FIG. 6 is a flowchart illustrating another example of the process performed by the diagnosis assisting information providing unit of the pathological diagnosis assisting apparatus illustrated in FIG. 1.

In FIG. 6, the diagnosis assisting information providing unit 105 first determines, for a subject image of the stained sample, whether the total of the occupancy rates of the collagenous fiber and the elastic fiber satisfies the threshold described above, which is the total of the occupancy rates of the collagenous fiber and the elastic fiber (step S11). Then, the diagnosis assisting information providing unit 105 classifies the image of the stained sample satisfying the threshold as positive for tissue fibrosis (step S12). On the other hand, the diagnosis assisting information providing unit 105 classifies the image of the stained sample not satisfying the threshold as negative for tissue fibrosis (step S13). The pathological diagnosis assisting apparatus according to the present embodiment, as described above, may easily assist diagnosis of the presence or absence of tissue fibrosis by comparing the total of the occupancy rates of the collagenous fiber and the elastic fiber to one threshold. Preferably, the diagnosis assisting information providing unit 105, by presenting the occupancy rate of the elastic fiber as the standard for the image of the stained sample classified as positive for tissue fibrosis, may assist diagnosis of a generation time of a fibrotic tissue.

Needless to say, as the threshold used in FIG. 6, a value which, when the total of the occupancy rates exceeds this value, the occupancy rate is highly possibly corresponds to any of F3 to F4 according to New Inuyama Classification, may be used. In this case, the diagnosis assisting information providing unit 105 may provide a result of determination on the presence or absence of tissue fibrosis whose progression is F3 or higher according to New Inuyama Classification.

Further, for pathological diagnosis by METAVIR method, which is similar to New Inuyama Classification, the pathological diagnosis assisting apparatus according to the present embodiment may provide highly accurate diagnosis assisting information.

The following is a description of, with reference to Table 1 and Table 2, efficacy of the medical diagnosis assisting information provided by the pathological diagnosis assisting apparatus according to the present embodiment, based on actual data. Table 1 illustrates a result of assessment of accuracy of the pathological diagnosis assisting information provided by the pathological diagnosis assisting apparatus according to the present embodiment. In detail, Table 1 illustrates accuracy rates when the samples classified as F4 according to New Inuyama Classification are classified based on the occupancy rate of the collagenous fiber and when the samples classified as F2 or F3 according to New Inuyama Classification are classified based on the total of the occupancy rates of the collagenous fiber and the elastic fiber. Table 2 illustrates the accuracy rates when the samples classified as F4 according to New Inuyama Classification are classified based on the occupancy rate of the collagenous fiber and when the samples classified as F2 or F3 according to New Inuyama Classification are classified based on the occupancy rate of the collagenous fiber alone. Namely, in obtaining the result illustrated in Table 2, the occupancy rate of the elastic fiber is not used. That is, Table 2 illustrates a result of assessment of accuracy of the pathological diagnosis assisting information without using the pathological diagnosis assisting apparatus according to the present embodiment, for comparison purposes. The accuracy rates are defined as values ($C_i/N_i$, i=F2, F3, F4) calculated by dividing a number of samples ($C_i$) classified as each of the stages (F2-F4) in an example according to the present invention and in a comparison example by the number of samples ($N_i$) appropriately assigned to the stages of fibrosis according to New Inuyama Classification by the pathologist.

Since New Inuyama Classification is a pathological diagnosis method widely practiced by pathologists in recent years, it is important to assess accuracy of the diagnosis information using a diagnosis result based on New Inuyama Classification by the pathologist as a correct value, in order to examine usefulness of the pathological diagnosis assisting apparatus according to the present embodiment. The number of pixels of the stained sample used for the assessment was n=38. Each of the 38 images of the stained sample was obtained from a different specimen.

TABLE 1

| Threshold | Accuracy Rate | | |
|---|---|---|---|
| (Occupancy Rate) | F2 | F3 | F4 |
| 0.071 | 0.62 | 0.71 | 0.91 |
| 0.081 | 0.77 | 0.64 | 0.91 |
| 0.101 | 0.85 | 0.50 | 0.91 |
| 0.111 | 0.92 | 0.43 | 0.91 |

TABLE 2

| Threshold (Occupancy Rate of | Accuracy Rate | | |
|---|---|---|---|
| Collagenous Fiber) | F2 | F3 | F4 |
| 0.055 | 0.62 | 0.71 | 0.91 |
| 0.064 | 0.69 | 0.64 | 0.91 |
| 0.076 | 0.85 | 0.57 | 0.91 |
| 0.096 | 0.92 | 0.07 | 0.91 |

A method to determine the predetermined threshold used at step S06 described above in order to obtain the results illustrated in Table 1 and Table 2 will be described. First, New Inuyama Classification is preliminarily practiced for a corresponding number of the stained samples (n=38) by the pathologist and, for the same samples, the operations at steps S02-S04 described above are performed. For each of the stained samples, the result according to New Inuyama Classification and the occupancy rate of the collagenous fiber calculated through the operations at steps S02-S04 are linked to each other, and the ROC analysis is performed by using the results according to New Inuyama Classification and the occupancy rates of the collagenous fiber.

The accuracy rates depended strongly on the threshold. At step S06 described above, since the best cut-off value was used as the threshold, the accuracy rates at F4 according to New Inuyama Classification in Table 1 and Table 2 resulted in equal to each other. The samples not classified as F4 according to New Inuyama classification were classified as either F2 or F3 according to New Inuyama Classification, by using the thresholds illustrated in the left columns in Table 1 and Table 2. At this time, the threshold in Table 1 is the total of the occupancy rate of the collagenous fiber and that of the elastic fiber, while the threshold in Table 2 is the occupancy rate of the collagenous fiber alone. For the stages F2 and F3 according to New Inuyama Classification, the accuracy rates are similar or better when the total of the occupancy rate of the elastic fiber and that of the collagenous fiber are used as illustrated in Table 1. The threshold of the total of the occupancy rate of the collagenous fiber and that of the elastic fiber, 0.081, underlined in Table 1 is the most successful threshold, considering F2-F4 according to New Inuyama Classification. Also, a value of AUROC (area under ROC curve) in classification as F2 and F3 according to New Inuyama Classification illustrated in Table 1 is 0.839, while the value of AUROC in Table 2 is 0.762. It was thus verified that, regardless of the value of the threshold, classification as F2 and F3 according to New Inuyama Classification in Table 1 was more accurate than that in Table 2.

As described above, it was suggested that, by using the total of the occupancy rates of the collagenous fiber and the elastic fiber, fibrosis of the sample at low fibrosis stages (F2 and F3 according to New Inuyama Classification), in particular, may be accurately classified. This is because, for the tissue where fibrosis is caused relatively shortly before obtainment of the stained sample, accuracy of extraction is improved by using the elastic fiber as the index, as well. That is, the present invention, in image processing of the stained sample, by determining a quantity of the elastic fiber slowly accumulated in a fibrous septa and determining a fibrosis stage based on the total of the occupancy rate of the elastic fiber and that of the collagenous fiber, provides a new index enabling screening for how old/new the fibrotic fiber is or when the fibrotic fiber was generated. Since the accuracy of classification of the sample at relatively low fibrosis stage is improved as described above, accurate scoring of fibrosis progression is enabled and more appropriate monitoring of the risk of developing cancer is enabled.

With reference to Table 3, efficacy of determination on the presence or absence of tissue fibrosis by comparing the total of the occupancy rates of the collagenous fiber and the elastic fiber to at least one threshold will be described based on actual data. Table 3 illustrates, in order to determine the presence or absence of tissue fibrosis, a correlation between a result when the occupancy rate of the collagenous fiber alone is used as the standard and a result of diagnosis according to New Inuyama Classification by the pathologist (Correlation I), and a correlation between a result when the total of the occupancy rates of the collagenous fiber and the elastic fiber is used as the standard and the result of diagnosis according to New Inuyama Classification by the pathologist (Correlation II), in a comparing manner. Determination on the presence or absence of tissue fibrosis corresponds to, in detail, determination on which stage of F2-F4 according to New Inuyama Classification the sample corresponds to. The correlation coefficients in Table 3 are Spearman's rank-correlation coefficients. The number of images of the stained sample used for making Table 3 was n=38. Each of the 38 images of the stained sample was obtained from a different specimen.

TABLE 3

| | Correlation I (Collagenous Fiber) | Correlation II (Collagenous Fiber and Elastic Fiber) |
|---|---|---|
| Average Value | 0.67 | 0.71 |
| Average Value after Mask Processing | 0.73 | 0.78 |

The occupancy rates illustrated in Table 3 are average values of the occupancy rate of the collagenous fiber and the occupancy rate of the elastic fiber calculated for each of the tiles dividing the image of the stained sample. The "Average Value after Mask Processing" in Table 3 represents, in the tissue area of the stained sample extracted at step S03 in FIG. 2, an average value of the occupancy rates calculated by using the image of the stained sample having the areas of the existing blood vessel and capsule, which are irrelevant to the lesion, subjected to the mask processing. The "Average Value" represents an average of the occupancy rates calculated by using the image of the stained sample not subjected to the mask processing.

As can be seen in Table 3, the values when the presence or absence of tissue fibrosis is determined by using the total of the occupancy rates of the collagenous fiber and the elastic fiber have a correlation with the results according to New Inuyama Classification practiced by the pathologist higher than the values when the presence or absence of tissue fibrosis is determined by using the occupancy rate of the collagenous fiber alone. By determining on the presence or absence of tissue fibrosis by using the occupancy rate of the elastic fiber in addition to the occupancy rate of the collagenous fiber as described above, accuracy of determination may be improved.

Table 4 illustrates, in order to determine tissue fibrosis progression at the stage F3 or higher according to New Inuyama Classification, a comparison between a correlation between a result when the occupancy rate of the collagenous fiber alone is used as the standard and a result of diagnosis according to New Inuyama Classification by the pathologist (Correlation I), and a correlation between a result when the total of the occupancy rates of the collagenous fiber and the elastic fiber is used as the standard and the result of diagnosis according to New Inuyama Classification by the pathologist (Correlation II). In a similar manner to Table 3, 38 images of the stained sample, each of which was obtained from a different specimen, were used. A detail of the calculation method of the occupancy rate used in Table 4 is similar to that in Table 3.

TABLE 4

| | Correlation I (Collagenous Fiber) | Correlation II (Collagenous Fiber and Elastic Fiber) |
|---|---|---|
| Average Value | 0.83 | 0.88 |
| Average Value after Mask Processing | 0.88 | 0.92 |

As can be seen in Table 4, in determining whether tissue fibrosis progression is at the stage F3 according to New Inuyama Classification or higher, the values determined by using the occupancy rate of the elastic fiber in addition to the occupancy rate of the collagenous fiber has a higher correlation with the results according to New Inuyama Classification by the pathologist. As described above, by using the occupancy rate of the elastic fiber in addition to that of the collagenous fiber, determination on the presence or absence of tissue fibrosis progression at the stage of F3 or higher according to New Inuyama Classification may be improved.

Although one embodiment of the present invention is described above, the pathological diagnosis assisting apparatus 100 in one mode of the present invention may be configured by using a computer. In such a computer, the program for implementing the function of the image processing unit 101 is stored in the computer or an external memory unit. The external memory unit may be an external storage device such as an external hard disk or an internal storage device such as ROM (Read Only Memory) or RAM (Random Access Memory). The computer functioning as described above may be controlled by the CPU (Central Processing Unit) or the like. That is, the CPU, by appropriately reading the program describing an operation to implement a function of each component from the memory unit, may implement the function of each component on the computer. Here, the function of each component may be implemented by a part of hardware.

Or, the program describing the operation may be stored in a portable (non-transitory) storage medium such as, for example, DVD (Digital Versatile Disc) or the CD-ROM to be distributed through selling, giving, renting and the like of the medium. Further, distribution of the program may be made by storing the program in a memory unit of a server in a network and transferring the program from the server to another computer via the network.

Such a computer for executing the program may once store, for example, the program stored in the portable storage media or the program transferred from the server in a memory unit thereof. In another embodiment of the program, the computer may read the program directly from the portable storage medium and execute an operation according to the program. Further, each time the program is transferred to the computer from the server, the computer may sequentially execute operations according to the received program.

In addition to the embodiment of the present invention described above, a various change may be made to CLAIMS. For example, although an EVG stained image is used in the above embodiment, a staining method is not limited thereto but, as long as the stained sample includes the collagenous fiber and the elastic fiber stained in color distinguishable from other components of the tissue, any staining method may be used for the pathological diagnosis assisting apparatus, the pathological diagnosis assisting method and the non-transitory computer readable medium storing a pathological diagnosis assisting program according to the present invention.

Further, although in the above embodiment the pathological diagnosis assisting apparatus according to the present invention is used for the stained pathology sample prepared from the lesional sample obtained by the liver biopsy, the pathological diagnosis assisting apparatus according to the present invention may be used not only for the stained pathology sample obtained by the liver biopsy but also for providing the pathological diagnosis assisting information about fibrosis of other organs, such as the lung, for example.

EXPLANATION OF REFERENCE NUMERALS

100 Pathological Diagnosis Assisting Apparatus
101 Image Processing Unit
102 Image Classification Unit
103 Tissue Area Extraction Unit
104 Occupancy Rate Calculation Unit
105 Diagnosis Assisting Information Providing Unit
106 Control Unit
107 Image Reading Unit
108 Operation Unit
109 Display Unit

What is claimed is:

1. A pathological diagnosis assisting apparatus for providing diagnosis assisting information for assisting diagnosis of tissue fibrosis from an image of a stained sample, the pathological diagnosis assisting apparatus including a processing unit connected to a tangible non-transitory memory capable of executing a series of executable instructions stored in the memory, and comprising:

an image reading unit configured to read the image of the stained sample; and an image processing unit configured to process the image of the stained sample, wherein the image processing unit includes an image classification unit configured to, based on a pixel value of the image of the stained sample, classify at least a collagenous fiber and an elastic fiber in the image of the stained sample, a tissue area extraction unit configured to extract a tissue area in the image of the stained sample, an occupancy rate calculation unit configured to, based on a result of classification of both the collagenous fiber and elastic fiber in the image, calculate occupancy rates of the collagenous fiber and the elastic fiber in the tissue, and a diagnosis assisting information providing unit configured to provide the diagnosis assisting information based on the calculated occupancy rates of the collagenous fiber and the elastic fiber, wherein the diagnosis assisting information providing unit preliminarily holds a first threshold and a second threshold serving as standards for determination of a stage of tissue fibrosis progression, determines whether the occupancy rate of the collagenous fiber satisfies the first threshold and, when determining that the occupancy rate of the collagenous fiber does not satisfy the first threshold, determines whether a total of the occupancy rates of the collagenous fiber and the elastic fiber satisfies the second threshold.

2. The pathological diagnosis assisting apparatus according to claim 1, wherein the diagnosis assisting information providing unit preliminarily holds at least one threshold serving as the standard for determination of the stage of tissue fibrosis progression, and determines whether the total of the occupancy rates of the collagenous fiber and the elastic fiber satisfies the at least one threshold.

3. A pathological diagnosis assisting method for providing diagnosis assisting information for assisting diagnosis of tissue fibrosis from an image of a stained sample, comprising:
   an image reading step to read the image of the stained sample; and
   an image processing step to process the image of the stained sample, wherein the image processing step includes an image classifying step, based on a pixel value of the image of the stained sample, to classify at least a collagenous fiber and an elastic fiber in the image of the stained sample,
   a tissue area extracting step to extract a tissue area in the image of the sample,
   an occupancy rate calculation step, based on a result of classification of both the collagenous fiber and elastic fiber in the image, to calculate occupancy rates of the collagenous fiber and the elastic fiber in the tissue area, and
   a diagnosis assisting information providing step to provide the diagnosis assisting information based on the calculated occupancy rates of the collagenous fiber and the elastic fiber,
   wherein the diagnosis assisting information providing step includes preliminarily holding a first threshold and a second threshold serving as standards for determination of a stage of tissue fibrosis progression, determining whether the occupancy rate of the collagenous fiber satisfies the first threshold and, when determining that the occupancy rate of the collagenous fiber does not satisfy the first threshold, determining whether a total of the occupancy rates of the collagenous fiber and the elastic fiber satisfies the second threshold.

4. A non-transitory computer readable medium storing a pathological diagnosis assisting program makes a computer serving as a pathological diagnosis assisting apparatus for providing diagnosis assisting information for assisting diagnosis of tissue fibrosis from an image of a stained sample execute:
   an image reading step to read the image of the stained sample;
   an image classifying step, based on a pixel value of the image of the stained sample, to classify at least a collagenous fiber and an elastic fiber in the image of the stained sample;
   a tissue area extracting step to extract a tissue area in the image of the sample;
   an occupancy rate calculation step, based on a result of classification of both the collagenous fiber and elastic fiber in the image, to calculate occupancy rates of the collagenous fiber and the elastic fiber in the tissue area; and
   a diagnosis assisting information providing step to provide the diagnosis assisting information based on the calculated occupancy rates of the collagenous fiber and the elastic fiber
   wherein the diagnosis assisting information providing step includes preliminarily holding a first threshold and a second threshold serving as standards for determination of a stage of tissue fibrosis progression, determining whether the occupancy rate of the collagenous fiber satisfies the first threshold and, when determining that the occupancy rate of the collagenous fiber does not satisfy the first threshold, determining whether a total of the occupancy rates of the collagenous fiber and the elastic fiber satisfies the second threshold.

* * * * *